United States Patent
Hara et al.

(10) Patent No.: US 10,090,934 B2
(45) Date of Patent: Oct. 2, 2018

(54) OPTICAL RECEIVER MODULE THAT RECEIVES WAVELENGTH-MULTIPLEXED SIGNAL

(71) Applicant: Sumitomo Electric Industries, Ltd., Osaka-shi (JP)

(72) Inventors: Hiroshi Hara, Yokohama (JP); Masanobu Kawamura, Yokohama (JP); Takahiro Saito, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 15/347,193

(22) Filed: Nov. 9, 2016

(65) Prior Publication Data
US 2017/0134099 A1    May 11, 2017

(30) Foreign Application Priority Data

Nov. 10, 2015 (JP) .................................. 2015-220208
Jul. 19, 2016 (JP) .................................. 2016-141893

(51) Int. Cl.
*H04B 10/06* (2006.01)
*H04B 10/66* (2013.01)
(Continued)

(52) U.S. Cl.
CPC ........... *H04B 10/66* (2013.01); *G02B 6/2938* (2013.01); *G02B 6/29367* (2013.01);
(Continued)

(58) Field of Classification Search
CPC ......... H04J 14/02; H04B 10/66; H04B 10/40; H04B 10/60; G02B 6/2938; G02B 6/32; G02B 6/34; G02B 6/29367; G02B 6/4246

USPC ....... 398/79, 82, 85, 88, 158, 159, 135, 136, 398/202, 208, 164, 138, 139, 86, 212; 385/24, 37, 14, 89, 92, 90, 93, 47
See application file for complete search history.

(56) References Cited

U.S. PATENT DOCUMENTS 6,636,658 B2 * 10/2003 Goodman ............ G02B 6/2713
                                                                    385/24
8,540,437 B2 *  9/2013 Lee ....................... G02B 6/4215
                                                                    385/31
(Continued)

FOREIGN PATENT DOCUMENTS

JP     2002-040283 A    2/2002
JP     2009-198576 A    9/2009
(Continued)

*Primary Examiner* — Hanh Phan
(74) *Attorney, Agent, or Firm* — Venable LLP; Michael A. Sartori; Laura G. Remus (57) ABSTRACT

An optical receiver module that receives a wavelength-multiplexed optical signal is disclosed. The optical receiver module includes a first lens, an optical de-multiplexer, second lenses, and photodiodes. The first lens forms a beam waist of the wavelength-multiplexed optical signal output therefrom. The optical de-multiplexer de-multiplexes the wavelength-multiplexed optical signal into optical signals depending on wavelengths thereof and is installed so as to make optical paths for respective optical signals different from each other. The second lenses concentrate the optical signals onto the respective photodiodes. In the optical receiver module, the beam waist of the wavelength-multiplexed optical signal is set in a halfway between a longest path and a shortest path from the first lens to the second lenses.

19 Claims, 10 Drawing Sheets

(51) Int. Cl.
*H04J 14/02* (2006.01)
*G02B 6/293* (2006.01)
*G02B 27/09* (2006.01)
*G02B 6/42* (2006.01)

(52) U.S. Cl.
CPC ....... *G02B 6/4215* (2013.01); *G02B 27/0955* (2013.01); *H04J 14/02* (2013.01); *G02B 6/4214* (2013.01)

(56) References Cited

U.S. PATENT DOCUMENTS

| | | |
|---|---|---|
| 9,285,544 B2 * | 3/2016 | Panotopoulos ...... G02B 6/4231 |
| 2010/0209103 A1 | 8/2010 | Sakigawa et al. |
| 2013/0148970 A1 | 6/2013 | Nakajima et al. |
| 2014/0346323 A1 | 11/2014 | Fujimura et al. |
| 2015/0055665 A1 | 2/2015 | Nakajima |
| 2015/0365175 A1 | 12/2015 | Kawamura et al. |
| 2015/0365176 A1 | 12/2015 | Kawamura et al. |
| 2016/0164612 A1 * | 6/2016 | Wilks .................... H04B 10/40 398/79 |
| 2016/0170145 A1 | 6/2016 | Kawamura et al. |

FOREIGN PATENT DOCUMENTS

| | | |
|---|---|---|
| JP | 2009-198958 A | 9/2009 |
| JP | 2010-186090 A | 8/2010 |
| JP | 2011-209367 A | 10/2011 |
| JP | 2013-125045 A | 6/2013 |

* cited by examiner

Distance from fiber tip to 1st lens

OPTICAL RECEIVER MODULE THAT RECEIVES WAVELENGTH-MULTIPLEXED SIGNAL

BACKGROUND OF THE INVENTION

1. Field of the Invention

The present invention relates to an optical receiver module, in particular, the invention relates to an optical receiver module that receives a wavelength-multiplexed signal that multiplexes optical signals each attributed to a specific wavelength different from each other, and converts the optical signals into electrical signals.

2. Related Background Arts

As the communication capacity explosively increases, not only an accelerated transmission speed but a thicker transmission capacity has been requested. The transmission speed reaches, for instance, 40 Gbps (gig-bit per second), and sometimes exceeds 100 Gbps. The thicker transmission capacity is going to be accomplished by a wavelength division multiplexing (WDM) system where optical signals are transmitted as being multiplexed by wavelengths thereof.

A receiver optical receiver module that receives such a wavelength-multiplexed signal requires a function of de-multiplexing the wavelength-multiplexed signal and generating or recovering optical signals independent to each other. United States Patent US2013/148970A has disclosed such an optical receiver module that receives the wavelength-multiplexed signal.

SUMMARY OF THE INVENTION

One aspect of the present invention relates to an optical receiver module that receives a wavelength-multiplexed signal containing optical signals having respective wavelengths specific thereto and different from each other. The optical receiver module of the invention provides a first lens, an optical de-multiplexer, second lenses, and photodiodes. The first lens receives and concentrates the wavelength-multiplexed signal as forming a beam waist. The optical de-multiplexer de-multiplexes the wavelength-multiplexed signal into the optical signals depending on the wavelengths. The optical de-multiplexer sets optical distances for the optical signals different from each other. The second lenses concentrate the optical signals output from the optical de-multiplexer. The photodiodes receive the optical signals output from the second lenses. A feature of the optical receiver module of the present invention is that the beam waist of the wavelength-multiplexed signal formed by the first lens is positioned in midway between a longest path and a shortest path from the first lens to the second lenses for the optical signals. The optical receiver module may further include an optical fiber that provides the wavelength-multiplexed signal to the first lens. The optical fiber in an end thereof may be set apart from a focal point of the first lens toward the optical fiber. The beam waist may be positioned in an average of optical paths from the first lens to the second lenses for the optical signals.

Still an aspect of the preset invention also relates to an optical receiver module that receives a wavelength-multiplexed signal containing optical signals having respective wavelengths different from each other. The optical receiver module includes a first lens, a wavelength selective filter (WSF), first and second optical de-multiplexers, and a second lenses. The first lens concentrates the wavelength-multiplexed signal as forming a beam waist. The WSF transmits a portion of the wavelength-multiplexed signal and reflects a rest of the wavelength-multiplexed signal depending on the wavelengths. The WSF in an input optical axis thereof makes an angle less than 20° against an optical axis of the wavelength-multiplexed signal entering therein. The first optical de-multiplexer de-multiplexes the portion of the wavelength-multiplexed signal and output a portion of the optical signals. The second optical de-multiplexer de-multiplexes the rest of the wavelength-multiplexed signal and output a rest of the optical signals. A feature of the optical receiver module of the invention is that the beam waist of the wavelength-multiplexed signal output from the first lens is positioned in midway between a longest path and a shortest path from the first lens to the second lenses for the optical signals.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment of an optical receiver module according to the present invention will be described as referring to accompanying drawings. In the description of the drawings, numerals or symbols same with or similar to each other will refer to elements same with or similar to each other without duplicating explanations.

The optical receiver module disclosed in the prior patent document provides a first lens that collimates the wavelength-multiplexed signal, an optical de-multiplexer that de-multiplexes the wavelength-multiplexed signal and generates optical signals, second lenses each concentrating the optical signals, and photodiodes (PDs) that receive concentrated optical signals independently. The optical receiver module thus configured may install those optical and electrical components within a compact housing. However, because the optical signals have optical paths from the first lens to the PDs whose lengths are different from each other, the optical coupling efficiency of the respective optical signals by the PDs sometimes show unacceptable discrepancy even the first lens converts the wavelength-multiplexed signal into a collimated beam. The optical receiver module according to the present invention may solve this subject.

First Embodiment

Figure 1:
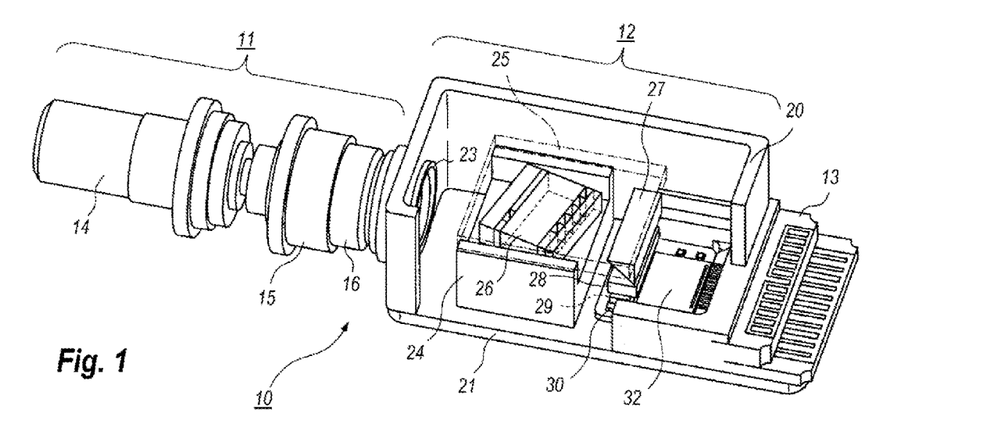
FIG. 1 is a perspective view showing an inside of an optical module according to the present invention.
Figure 2A:
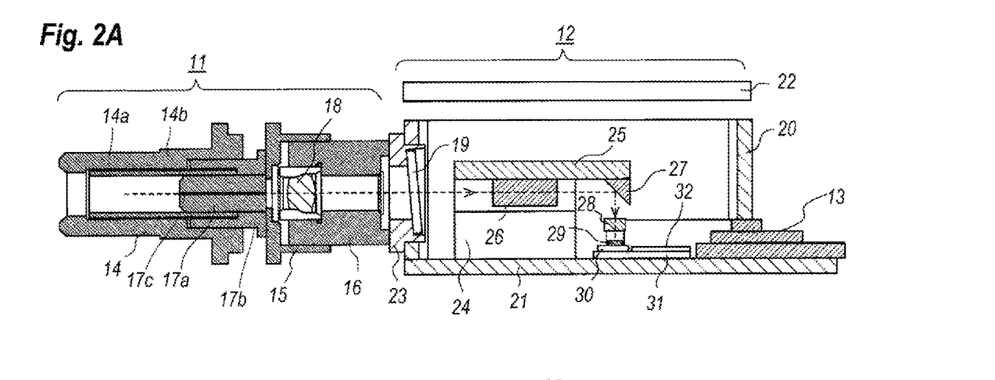
FIG. 2A shows a side cross section of the optical module shown in FIG. 1, and FIG. 2B magnifies an optically primary portion shown in FIG. 2A.
Figure 2B:
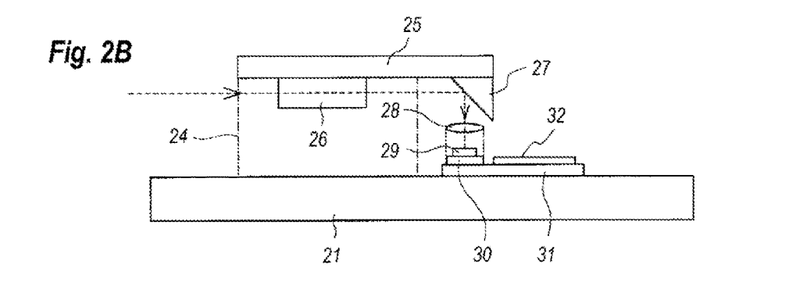

FIG. 1 is a perspective view of an optical receiver module according to embodiment of the present invention, FIG. 2A shows a side cross section of the optical receiver module and FIG. 2B magnifies an optical arrangement in the optical receiver module shown in FIG. 1. FIG. 1 omits a ceiling and a portion of side walls to investigate an inside of the optical receiver module.

The optical receiver module 10 receives a wavelength-multiplexed signal that multiplexes optical signals each attributed to a wavelength different from each other, and generates electrical signals each corresponding to the optical signals multiplexed within the received signal. Referring to FIG. 1, the optical receiver module 10 includes a coupling portion 11 that receives an external fiber, which may be a single mode fiber (SMF), and a body portion 12 that encloses optical components and electrical components therein. The body portion 12 provides an electrical terminal 13. The coupling portion 11 includes a sleeve 14 that mates with an optical ferrule attached in a tip of the external SMF, a lens holder 16 that secures a first lens 18, and a joint sleeve 15 that enables the sleeve 14, or the external SMF, to be aligned with optical components installed in the body portion 12. The holder 16 is permanently fixed to the body portion 12. The explanation below assumes a side of the coupling portion 11 with respect to the body portion 12 to be "front" or "forward", while, another side where the electrical terminal 13 is provided to be "rear" or "backward". However, these assumptions are introduced merely by explanation sake and could not influence a range of the present invention.

The body portion 12 includes a frame 20, a bottom 21, and a lid 22, where these elements, 20 to 22, form a box-shaped housing as shown in FIG. 2A. The frame 20 provides a flange 23 in a front wall thereof. The bottom 21 is made of material having substantial thermal conductivity and adequate thermal expansion co-efficient, which are typically copper molybdenum (CuMo) or copper tungsten (CuW). The bottom 21 is fixed to the frame 20, while, the lid 22 is welded to a top of the frame 20, which may seal an inside of the body portion 12 air-tightly. The electrical terminal 13, which is exposed from a rear wall of the frame 20, includes ceramic substrates each providing pads and interconnections thereon. Electrical components installed within the body portion 12 may externally communicate through the interconnections and the pads of the electrical terminal 13.

Referring to FIG. 2A, the holder 16 is fixed to the front wall of the frame 20 through the flange 23 in a rear surface thereof; while, fixes the sleeve 14 in a front portion thereof. The sleeve 14 includes a cylinder 14a, a stub 17a, a bush 17b, and a cover 14b, where the bush 17b secures a rear portion of the stub 17a, while, the cylinder 14a is inserted between the front portion of the bush 17b and the front portion of the stub 17a. The cover 14b covers the whole cylinder 14a and the front portion of the bush 17b. That is, the front portion of the bush 17b is press-fitted into a gap formed between the rear portion of the cover 14b and the rear portion of the cylinder 14a such that the cover 14b and the front portion of the bush 17b radially presses the cylinder 14a against the stub 17a. The sleeve 14 in the rear flange of the bush 17b is fixed to the front wall of the joint sleeve 15. Inserting the ferrule of the external SMF into the cylinder 14a, where the ferrule has a diameter substantially equal to a bore of the cylinder 14a, and abutting a tip of the ferrule against a top of the stub 17a, where the stub 17a secures a coupling fiber 17c in a center thereof; the external SMF and the coupling fiber 17c in the stub 17a may make a physical contact (PC) that restricts reflection at the interface therebetween. The optical alignment of the external SMF with respect to the optical components in the body portion 12 may be carried out by sliding the sleeve 14 on the front wall of the joint sleeve 15, which carries out the XY alignment perpendicular to the optical axis, and by sliding the joint sleeve 15 on an outer surface of the holder 16, which performs the Z alignment in parallel to the optical axis for adjusting a distance between a rear end of the stub 17a. The holder 16 secures the first lens 18 in a front portion thereof. Accordingly, the slide of the joint sleeve 14 with respect to the holder 15 may adjust a distance between the end of the coupling fiber 17c in the stub 17a and the collimating lens 18. Assuming that the end of the coupling fiber 17c in the stub 17b may be regarded as a point light source, the beam passing through the first lens 16 become a collimated beam when the end of the coupling fiber 17c positions on a focal point of the first lens 16.

However, the end of the coupling fiber 17c is not positioned on the focal point of the first lens 16 in the present optical receiver module. Exactly, the end of the coupling fiber 17c is set on a point slightly apart from the focal point. Because the coupling fiber 17c in the end thereof practically has substantial dimensions, that is, the end of the coupling fiber 17c may be not regarded as a point source, and the beam output from the first lens 16 is never converted into a true collimated beam.

Referring to FIGS. 2A and 2B, the body portion 12 installs the optical de-multiplexer 26, a mirror 27, an arrayed lens 28, and an arrayed PD 29. The optical de-multiplexer 26 and the mirror 27 are mounted on a carrier 25 so as to face against and apart from the bottom 21. The mirror 27 reflects the optical signals that come from the optical de-multiplexer 26, toward the bottom 21. The arrayed lens 28 and the arrayed PD 29 are vertically arranged on the bottom 21 through a sub-mount 30 and a base 31 so as to receive the optical signals reflected by the mirror 27.

Figure 3:
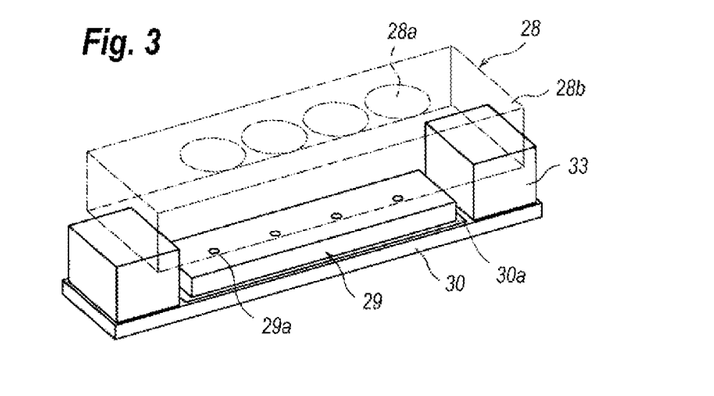
FIG. 3 is a perspective view showing an assembly of the arrayed lens and the arrayed photodiode (PD)

FIG. 3 is a perspective view showing the arrayed lens 28 and the arrayed PD 29 vertically arranged to each other on the sub-mount 30. The arrayed lens 28 includes lens elements 28a each receiving the optical signals reflected by the mirror 27. The arrayed PD 29 also includes four PD elements 29a each corresponding to the lens elements 28a. The arrayed lens 28 is arranged on the sub-mount 30 through posts 33 disposed in respective sides of the arrayed PD 29. The posts 33 secure a gap between the arrayed lens 28 and the arrayed PD 29. In the present embodiment, the lens elements 28a are formed in a top surface of a body of the arrayed lens 28, which may be made of silica glass. Accordingly, the gap between a back surface of the arrayed lens 28 and the PD elements 29a substantially becomes a focal length of the lens element 28a. The optical signals coming from the mirror 27 and entering the lens element 28a are concentrated on the PD elements 29a independent to each other.

The sub-mount 30 provides in a top surface thereof a metal pad 30a on which the arrayed PD 29 is bonded. Also, the sub-mount 30 provides other pads, which are hidden under the posts 33 in FIG. 3, each corresponding to the posts 33. That is, the posts 33 are plated with gold and bonded on the sub-mount 30 at respective pads. The posts 33 may be metal blocks.

Referring to FIG. 2B again, the optical de-multiplexer 26 and the mirror 27 are mounted on the carrier 25 which floats from the bottom 21 by interposing a support 24 against the bottom 21. The arrayed lens 28 and the arrayed PD 29 are vertically arranged in a space beneath the carrier 25. That is, the mirror 27, the arrayed lens 28, and the arrayed PD 29 are vertically aligned in the body portion 12 so as to form a room for installing electrical components therein. The optical axes of the optical signals just output from the optical de-multiplexer 26 make angles of 90° against optical axes of the optical signals reflected by the mirror 27. The body portion 12 of the present embodiment places an integrated circuit (IC) 32 for amplifying electrical signals generated by the PD elements 29a of the arrayed PD 29 that may be placed adjacent to the arrayed PD 29 in this room.

Figure 4:
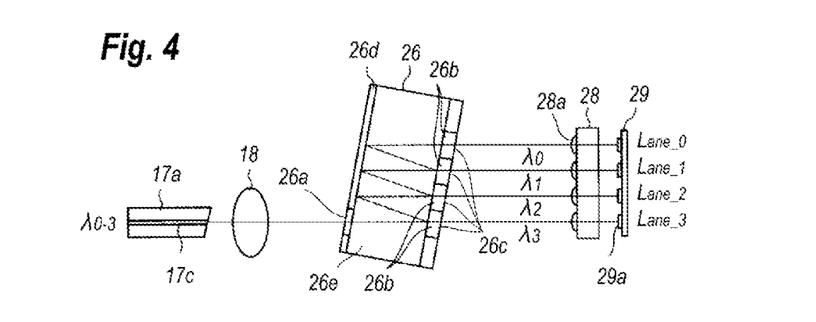
FIG. 4 schematically illustrates an optical coupling system in the optical module.

FIG. 4 schematically shows an optical coupling system between the coupling fiber 17c to the PD elements 29a according to the optical receiver module 10 of the present invention. The optical de-multiplexer 26 provides an input port 26a, wavelength selective filters (WSFs) 26b, output ports 26c, and a reflection film 26d in respective sides of a body block 26e. That is, the body block 26e, which is a rectangular block made of material transparent for the optical signals, provides the input port 26a and the reflection film 26d in one side thereof, while, the WSFs 26b and the output ports 26c in another side opposite to the former side. The number of WSFs 26b and the output ports 26d is equal to the number of the optical signals. FIG. 4 illustrates the optical coupling system for four (4) optical signals which are denoted as Lane_0 to Lane_3 having wavelengths of $\lambda_0$ to $\lambda_3$.

Further specifically, the coupling fiber 17c of the stub 17a outputs the wavelength-multiplexed signal that multiplexes four optical signals having wavelengths, $\lambda_0$ to $\lambda_3$, to the optical de-multiplexer 26 through the first lens 18. The wavelength-multiplexed signal thus received in the input port 26a of the optical de-multiplexer 26 heads the first WSF 26b, and the first WSF 26b only transmits the optical signal in the Lane_3 with the wavelength $\lambda_3$ and outputs from the first output port 26c; but reflects the other optical signals in the Lane_0 to Lane 2 with the wavelengths $\lambda_0$ to $\lambda_2$. The optical signals in the Lane_0 to the Lane_2 head the reflection film 26a within the transparent body block 26e, reflected thereby, and head the second WSF 26b. The second WSF 26b transmits only the optical signal in the Lane_2 with the wavelength $\lambda_2$ and outputs this optical signal in the Lane_2 from the second output port 26c; but reflects the rest optical signals containing the Lane_1 and Lane_0 having the wavelengths $\lambda_1$ and $\lambda_0$. Similarly, the third and fourth WSFs 26b transmits only the optical signals in the Lane_1 and the lane_0 of the wavelengths, $\lambda_1$ and $\lambda_0$. The optical de-multiplexer 26 outputs thus de-multiplexed optical signals from the respective output ports 26c. Four optical signals having respective wavelengths, $\lambda_0$ to $\lambda_3$, are output from the output ports 26d, advance to the mirror 27, reflected thereat, advance to the arrayed lens 28, and enter the arrayed PD 29.

The optical receiver module 10 thus configured has a feature that, although the optical components installed therein are substantially same with those installed in an optical receiver module disclosed in the prior patent document, the first lens 18 is set in a position different from that of the prior optical receiver module.

As FIG. 4 indicates, the optical de-multiplexer 26 installed in the present optical receiver module 10, or in conventional optical receiver module, inherently shows optical paths from the input port 26a to the output ports 26c for the respective lanes different from each other, which means that the optical paths from the first lens 18 to the respective lens elements 28a for the respective lanes are different from each other. The explanation below assumes that the first lane Lane_0 corresponds to the first optical path for the optical signal with the first wavelength $\lambda_0$, and subsequent lanes, Lane_1 to Lane_3, correspond to the optical signals having the wavelengths, $\lambda_1$ to $\lambda_3$, respectively, where the first lane Lane_0 has the longest optical path from the first lens 18 to the lens element 28a, while, the fourth lane Lane_3 has the shortest optical path.

In the conventional optical receiver module, the end of the coupling fiber 17c is precisely aligned at the focal point of the first lens to convert the wavelength-multiplexed signal output from the coupling fiber 17c into a collimated beam, and the lens elements 28a operate as concentrating lenses that concentrate the optical signals de-multiplexed by the optical de-multiplexer 26 onto the respective PD elements 29a.

However, even when an optical source is set at a focal point of a lens, a beam output from the lens becomes the true collimated beam only when the optical source may be regarded as a point source. Practically, the coupling fiber 17c in the end thereof has substantial dimensions, typically several micron meters in a signal mode fiber (SMF), and an optical beam output from the end of the coupling fiber 17c typically has a field pattern with the Gaussian distribution.

Figure 5:
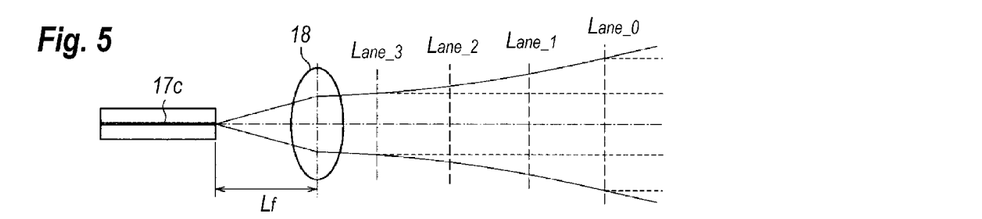
FIG. 5 schematically illustrates a beam profile output from the end of the coupling fiber in a conventional optical module.

FIG. 5 schematically illustrates a beam profile output from the end of the coupling fiber 17c in a conventional optical receiver module. As described above, even when the end of the coupling fiber 17c, which has the substantial dimensions, is aligned in the focal point Lf of the first lens 18, the optical beam output from the first lens 18 becomes a collimated beam only in a vicinity of the first lens 18, but the beam profile spreads as positions are apart from the first lens 18. The lane Lane_3, which has the shortest optical path, becomes the narrowest field pattern at the lens element 28a, but other lanes, Lane_2 to Lane_0, have respective expanded filed patterns at the lens elements 28a, which affects the coupling efficiency between the lens element 28a and the PD elements 29a.

Figure 6:
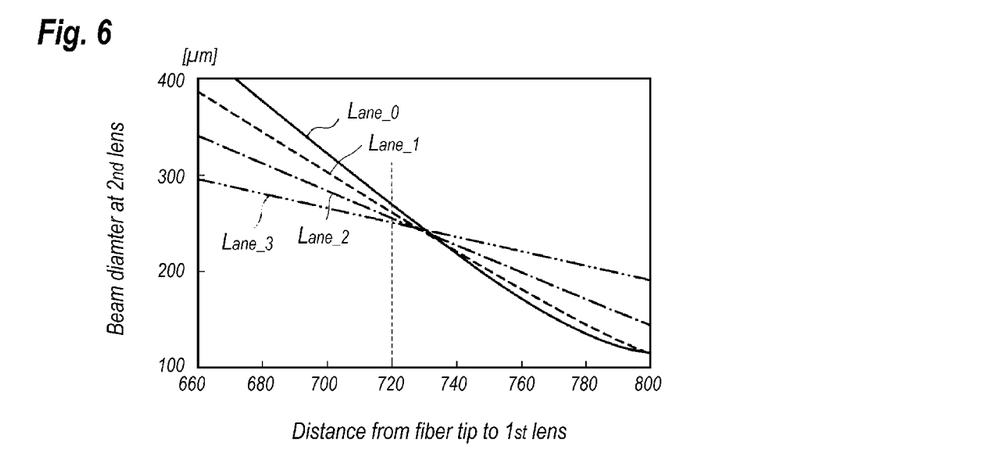
FIG. 6 shows relations between positions of the tip end of the coupling fiber measured from the first lens in the horizontal axis against beam diameters at the lens elements for respective lanes in the vertical axis.

FIG. 6 shows relations between positions of the end of the coupling fiber 17c from the first lens 18 in the horizontal axis against field patterns, namely, beam diameters, at the lens elements 28a for respective lanes, Lane_0 to Lane_3 in the vertical axis. The optical receiver modules have the first lens 18 whose focal length is 720 μm in the side of the coupling fiber 17c. Placing the end of the coupling fiber 17c in the focal point of the first lens 18, the beam diameters at the lens elements 28a become about 226 μm in the Lane_3, but the diameter becomes about 230 μm in the Lane_0, which is wider by 4 μm than that of the former Lane_3.

The lens elements 28a may compensate this difference of 4 μm in the field diameter without any additional elements or techniques, but, the optical coupling efficiency to the PD elements 29a becomes different. When the PD elements 29a are independent to each other, that is, distances between the PD elements 29a and the lens elements 28a are independently adjustable; the difference in the coupling efficiency could be compensated.

Figure 7:
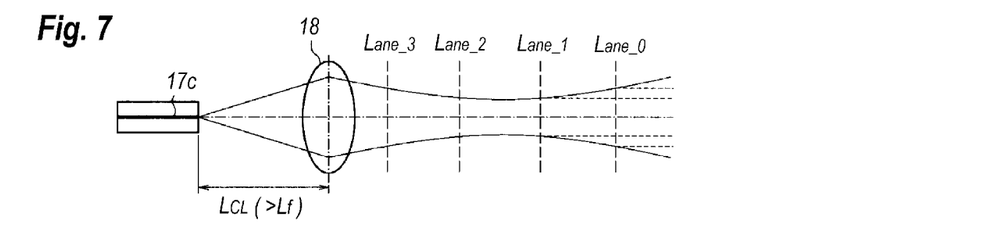
FIG. 7 schematically illustrates a beam profile output from the end of the coupling fiber in the optical module of the present invention.

FIG. 7 schematically illustrates the optical arrangement of the optical receiver module 10 according to the present invention. The optical receiver module 10 sets the end of the coupling fiber 17c slightly offset from the focal point of the first lens 18, exactly, the end of the coupling fiber 17c in the present embodiment is set slightly apart from the first lens 18 from the focal point thereof. Under such an optical arrangement, the optical beam output from the first lens 18 becomes a quasi-collimated beam.

Because a distance between the end of the coupling fiber 17c and the first lens 17 is slightly longer than the focal length Lf of the first lens 18, the optical beam output from the first lens 18 becomes a concentrated beam with a beam waist, which is a point where the field diameter becomes narrowest, in midway between two lanes, Lane_2 and Lane_1. Specifically, the beam waist is set in a position at which the optical paths for the lanes, Lane_0 to Lane_3, become an average, which means that the beam diameters at the lens elements 28a in differences between the respective lanes, Lane_0 to Lane_3, become smallest.

Figure 8:
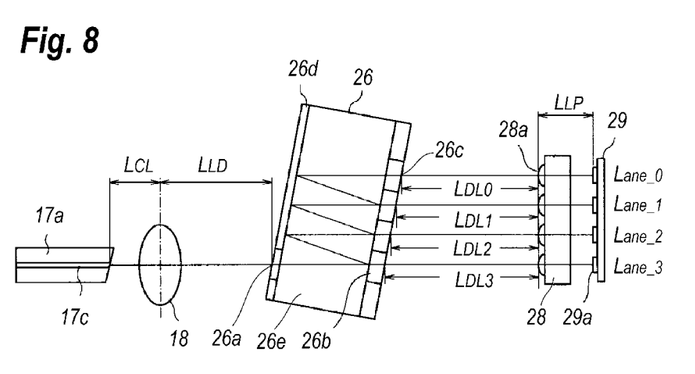
FIG. 8 schematically illustrates the optical coupling system of the optical module according to the present embodiment.

FIG. 8 schematically illustrates the optical coupling system of the optical receiver module 10 according to the present embodiment, where the first lens 18 has the focal length in the side of the coupling fiber 17c of 720 μm, the optical de-multiplexer 26 is arranged apart from the first lens 18 by 1 mm, $L_{LD}$=1 mm, and the optical de-multiplexer 26 is set as making a substantial angle of 15.1° against the optical axis of the first lens, that is, the incident angle of the optical beam output into the optical de-multiplexer 26 is set to be 15.1°.

In FIG. 8, the optical beam entering the optical de-multiplexer 26 advances in rectilinear to the WSF 26b, but, the Fresnel diffraction occurs at the input port 26a and the output port 26c. Accordingly, when the body block 26e is made of silica glass whose refractive index is about 1.51, an incident angle to the WSF 26b and that to the reflection film 26d become 10°. Also, the optical signals de-multiplexed by the optical de-multiplexer 26 in optical axes thereof become in parallel to each other and to the optical axis of the wavelength-multiplexed signal input to the optical de-multiplexer 26. The parallelism between the optical axes above described may be accomplished by the parallelism of the body block 26e of the optical de-multiplexer 26.

Because the output ports 26c are arranged on one side of the body block of the optical de-multiplexer 26, and this one side is also inclined with the optical axes, distances, $L_{DL0}$ to $L_{DL3}$, between the output ports 26c and the lens element 28a become 1.300, 1.435, 1.570, and 1.705 mm, respectively.

Thus, the optical distances from the first lens 18 to the respective lens elements 28a may be evaluated by adding the distance $L_{CL}$ from the end of the coupling fiber 17c to first lens 18, the optical paths within the body block 26e to the distance $L_{LD}$ from the first lens 18 to the input port 26a, distances, $L_{DL0}$ to $L_{DL3}$, from the output ports 26c to the lens elements 28a, and the distance $L_{LP}$ from the lens elements 28a to the PD elements 29a. Table below lists the optical distances and wavelengths for the respective lanes, Lane_0 to Lane_3.

|  | wavelength (nm) | optical distance (mm) |
| --- | --- | --- |
| Lane_0 | 1271 | 22.2 |
| Lane_1 | 1291 | 17.8 |
| Lane_2 | 1311 | 13.5 |
| Lane_3 | 1331 | 9.1 |

As the table above clearly shows, the Lane_0 has the longest distance exceeding 22 mm, while, the Lane_3 has the shortest distance of merely 9.1 mm, which is shorter than a half of the Lane_0.

Figure 9:
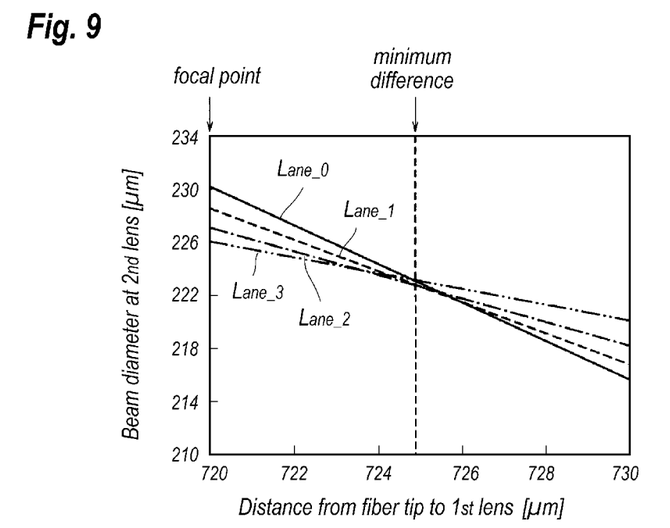
FIG. 9 magnifies behaviors of the beam diameters shown in FIG. 6 at the lens element in regions around a condition where the end of the coupling fiber positions in the focal point of the first lens.

FIG. 9 magnifies behaviors of the beam diameters, which are shown in FIG. 6, at the lens element 28a around a condition where the end of the coupling fiber 17c positions in the focal point of the first lens 18, which is 720 μm in the present arrangement. When the end of the coupling fiber 17c positions in the focal point; a difference of 230−226=4 μm in the beam diameters exists. On the other hand, as shifting the end position of the coupling fiber 17c from the focal point apart from the first lens 18, that is, as increasing a distance between the coupling fiber 17c and the first lens 18, the difference between the beam diameters at the lens elements 28a becomes smaller, and becomes less than 1 μm when the end position of the coupling fiber 17c is apart by 5 μm from the focal point of the first lens 18, at which the beam waist of the wavelength-multiplexed signal entering the optical de-multiplexer 26 positions in midway between the Lane_1 and Lane_2.

Figure 10:
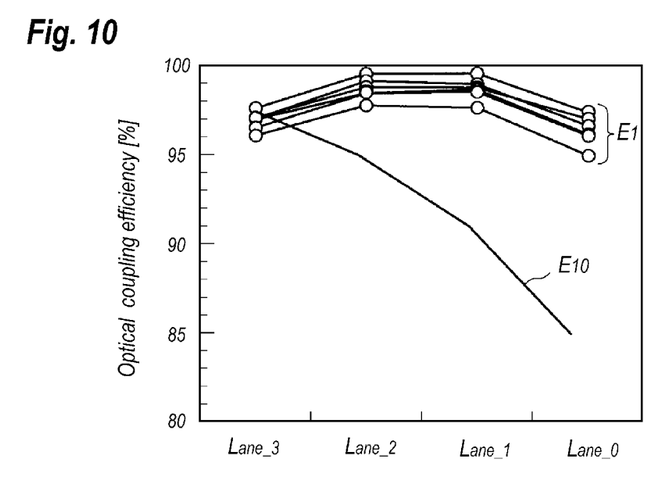
FIG. 10 shows coupling efficiencies between the coupling fiber and the PD elements when the end of the coupling fiber is set apart from the focal point of the first lens; and those when the end of the coupling fiber is set in the focal point of the first lens.

FIG. 10 shows coupling efficiencies between the coupling fiber 17c and the PD elements 29a each having a diameter of an optically sensing area of φ240 μm, where behaviors E1 show coupling efficiencies when the end of the coupling fiber 17c is apart by 725 μm from the first lens 18, while, E10 corresponds to a case where the end of the coupling fiber 17c is set in the focal point of the first lens 18, that is, the end of the coupling fiber 17c is set apart by 720 μm from the first lens 18.

Referring again to FIG. 5, assuming that the field pattern of the beam output from the first lens 18 exponentially spreads, the coupling efficiency to the PD elements 29a seems to degrade reciprocally depending on an exponential function. As the behavior E10 indicates in FIG. 10, the conventional optical arrangement between the coupling fiber 17c and the first lens 18 shows maximum coupling efficiency for the Lane_3, continuously and monotonically degrading coupling efficiency for the rest lanes, and becomes less than 90% for the Lane_0. However, when the distance between the end of the coupling fiber 17c and the first lens 18 is set to be 725 μm in the present optical receiver module, the beam waist positions substantially in an average of the path distances for the lanes, Lane_0 to Lane_3, which is between the Lane_1 and Lane_2; the coupling efficiency for the Lane_1 and that for the Lane_2 become maxima. Moreover, because of the restricted differences in the beam diameters in the present arrangement, the coupling efficiency for the Lane_0 and that for the Lane_3 still exceed 95%.

Second Embodiment

Figure 11:
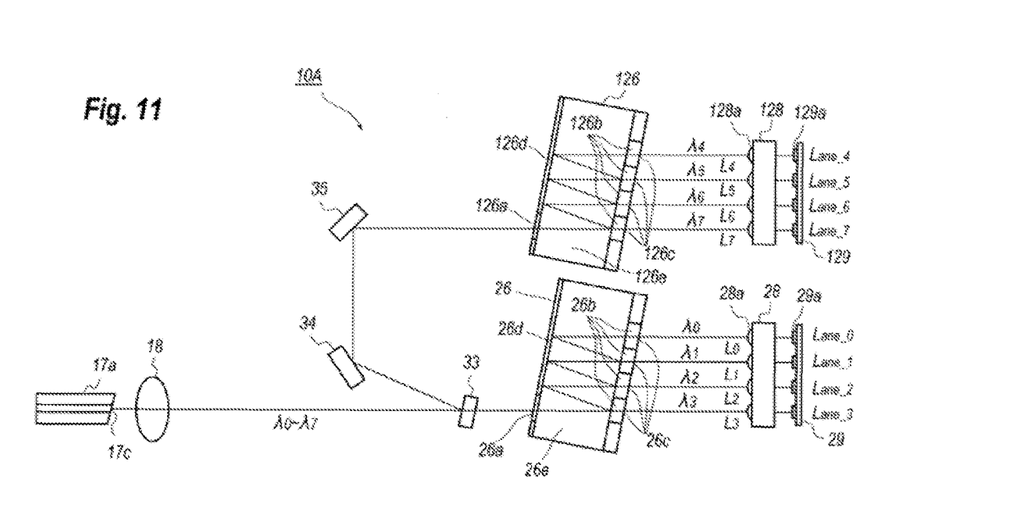
FIG. 11 schematically illustrates an optical system according to the second embodiment of the present invention.

FIG. 11 schematically illustrates an optical system implemented in the optical receiver module 10A. The coupling portion 11 and the body portion 12 of the optical receiver module 10A have arrangements substantially same with those of the first embodiment. The optical receiver module 10A of the second embodiment has a feature distinguishable from the optical receiver module 10 of the first embodiment is that the optical receiver module 10A receives the wavelength-multiplexed signal that multiplexes eight (8) optical signals each having wavelengths, $\lambda_0$ to $\lambda_7$, specific thereto and different from each other; and provides two optical de-multiplexers, 26 and 126, and a wavelength selective filter 33.

The WSF 33, which transmits the optical signals having relatively shorter wavelengths, $\lambda_0$ to $\lambda_3$, while, reflects the optical signals having relatively longer wavelengths, $\lambda_4$ to $\lambda_7$, is arranged inclined by less than 20°, preferably less than 15° with respect to the optical axis of the incoming optical beam, namely the wavelength-multiplexed signal, which compensates the degradation in the wavelength discrimination performance of the WSF 33. A WSF set in such an arrangement effectively isolates the wavelength-multiplexed signals with the shorter four wavelengths, $\lambda_0$ to $\lambda_3$, from the wavelength-multiplexed signal with the longer four wavelengths, $\lambda_4$ to $\lambda_7$.

The optical receiver module disclosed in a prior patent document discriminates four (4) signals having relative longer wavelengths from four (4) signals having relatively shorter wavelengths by a WSF and de-multiplexes respective four optical signals by two optical de-multiplexers evenly placed with respect to the WSF. This positional relation of the WSF and the two optical de-multiplexers is same with that of the present invention except for the fact that, in the optical module of the prior patent document, the light incoming the WSF makes a relatively large angle with respect to the axis of the input surface of the WSF; that is, the WSF in the input axis of the light-receiving surface thereof makes a half right angle with respect to the optical axis of the incoming light.

The wavelength discrimination of a WSF strongly depends on an incident angle of the light. The wavelength discrimination of the WSF is generally ensured when the incident angle is zero, that is, the WSF shows the higher performance in the wavelength discrimination when the light incoming thereto in the optical axis thereof becomes identical with the axis of the primary surface of the WSF; because the WSF is usually formed by a multi-layered dielectric films. As the incident angle of the incoming light becomes large, the performance or the ability of the wavelength discrimination of the WSF degrades. An increased number of the dielectric films may enhance the wavelength discrimination function; but such dielectric films inevitably reduce the transmittance of the light and raise a price thereof.

In the coarse wavelength division multiplexing (CWDM) system that defines a wavelength span to the neighbor lane to be 20 nm, the incident angle to the WSF is necessary to be less than 20°, preferably 15° to avoid interference between neighbor lanes. For instance, an optical receiver module disclosed in the prior patent document discriminates the shorter four (4) lanes from the longer four (4) lanes by a WSF. However, a lane with the longest wavelength among the shorter 4 lanes is occasionally involved within a lane with the shortest wavelength among the longer four (4) channels.

In another aspect, respective photo-detectors are preferably placed in an array along the optical de-multiplexers so as to receive the respective optical signals de-multiplexed by the optical de-multiplexer. Also, electrical components, which process electrical signals converted from the optical signals by the photo-detectors, are collectively assembled apart from the optical components even when the optical receiver module installs only one integrated circuit (IC) integrating eight (8) pre-amplifiers, to two ICs each integrating four (4) pre-amplifiers, and/or eight (8) pre-amplifiers independent to each other.

Referring to FIG. 11 again, a portion of the wavelength-multiplexed signal that contains relatively shorter wavelengths, $\lambda_0$ to $\lambda_3$, and transmits through the WSF 33, enters the optical de-multiplexer 26. A rest portion of the wavelength-multiplexed signal containing longer four wavelengths, $\lambda_4$ to $\lambda_7$, is reflected by the WSF 33, reflected twice by the mirrors, 34 and 35, so as to make the optical axis thereof in parallel to the former wavelength-multiplexed signal entering the optical de-multiplexer 26, and finally enters the second optical de-multiplexer 126. Both of optical de-multiplexors, 26 and 126, have arrangements same with each other; that is, an input port, 26a and 126a, a number of WSFs, 26b and 126b, a reflection film, 26d and 126d, and an output port, 26c and 126c, where those components are arranged in respective sides of a body block, 26e and 126e. The optical receiver module 10A of the present embodiment arranges these first and second optical de-multiplexors, 26 and 126, in side by side. This arrangement of the optical de-multiplexors, 26 and 126, enables the electrical components to be assembled collectively along one side of the optical receiver module 10A.

The first optical de-multiplexor 26 de-multiplexes the wavelength-multiplexed signal containing relatively shorter wavelengths, $\lambda_0$ to $\lambda_3$, into four independent optical signals by the mechanism same with that of the first embodiment, and output these optical signals from the output ports 26c thereof. The optical signals thus de-multiplexed and output from the output ports 26c enter the PD elements 29a concentrated by the respective lens elements 28a. Also, the second optical de-multiplexer 126 de-multiplexes the wavelength optical signal containing relatively longer wavelengths, $\lambda_4$ to $\lambda_7$, into four independent optical signals and outputs these four optical signals from the output ports 126c thereof. The optical signals output from the output ports 126c enter the PD elements 129a concentrated by the respective lens elements 128a. Similar to the first embodiment, the lens elements, 28a and 128a, are integrated within the arrayed lenses, 28 and 128; and the PD elements, 29a and 129a, are also integrated within the arrayed PDs, 29 and 129. The arrayed lenses, 28 and 128, and the arrayed PDs, 29 and 129, enable the optical receiver module 10A to be built within a small body.

The optical receiver module 10A thus described provides a function to receive the wavelength-multiplexed signal containing eight (8) wavelengths for the lanes, Lane_0 to Lane_7, and to process eight electrical signals corresponding to the respective lanes, Lane_0 to Lane_7, within a compact housing, but leaves a subject to be solved. That is, as FIG. 11 indicates, an optical path from the first lens 18 to the first optical de-multiplexer 26 for the lanes with shorter four wavelengths is inevitably shorter than an optical path from the first lens 18 to the second optical de-multiplexer 126 for the lanes with longer four wavelengths by a distance corresponding to a parallel displacement of the optical axis for the latter optical path. Also, same with the first embodiment, path distances for respective four lanes from the input ports, 26a and 126a, to the respective output ports, 26b and 126b, in the first and second optical de-multiplexers, 26 and 126, are different from each other. The optical system shown in FIG. 11 for the second embodiment has the path distances from the first lens 18 to the respective lens elements, 28a and 128a, longest in the fifth lane Lane_4 and shortest in the fourth lane Lane_3.

Figure 12:
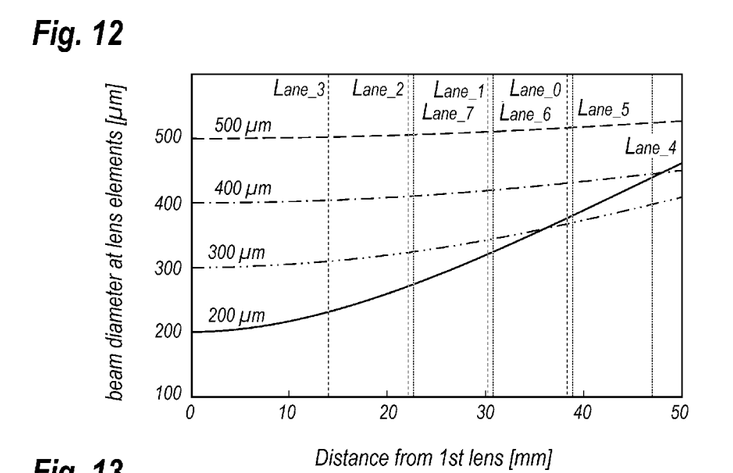
FIG. 12 shows expansion in the beam diameters for the first lens with various focal lengths assuming that the optical source originally has a Gaussian beam profile and positioned in the focal point of the first lens.

FIG. 12 shows expansion in the beam diameters for the first lens with various focal lengths, 200 to 500 μm of a first lens, assuming that the optical source originally has a Gaussian beam profile and this optical source is positioned in the focal point of the first lens. For example, a lens with the focal length of 200 μm, which is placed on the origin in the horizontal axis, generates the profile of the beam diameter of 200 μm at a distance of 0 mm and substantially expanding therefrom. Another lens with the focal point of 500 μm, which is placed also on the origin generates the beam profile of the diameter of 500 μm at a distance of 0 mm and gradually or moderately expanding therefrom. Thus, as the beam diameter expands, the degree of the expansion thereof may be restricted. However, a larger beam diameter requests a lens with a larger diameter and a larger focal length. Moreover, an optical de-multiplexer and a lens array are necessary to be enlarged, which inevitably requests the optical receiver module to have an enlarged housing.

The optical de-multiplexers, 26 and 126, which integrates four WSFs, 26b and 126, within the compact body blocks, 26e and 126e, are necessary to implement the WSFs with a substantial span in order to avoid interference between the lanes. Accordingly, the beam diameter incoming the optical de-multiplexer is requested to be 300 μm at most. In FIG. 12, symbols $L_N$ (N=0 to 7) denote respective optical distances from the first lens 18 to the lens elements, 28a and 128a. As shown in FIG. 12, two lanes, Lane_3 and Lane_7, which are equivalent lanes for the respective optical de-multiplexers, 26 and 126, makes a difference of about 10 mm, which corresponds to the path distance from the WSF 33 to the second optical de-multiplexer 126. According to the result shown in FIG. 12, the beam diameter of 300 μm never satisfies the condition of the beam diameter less than 300 μm for the optical de-multiplexers, 26 and 126, because the behavior for the beam diameter of 300 μm monotonically increases from the origin. Also, the beam diameter of 200 μm shows a large discrepancy within the respective optical de-multiplexers, 26 and 126.

Figure 13:
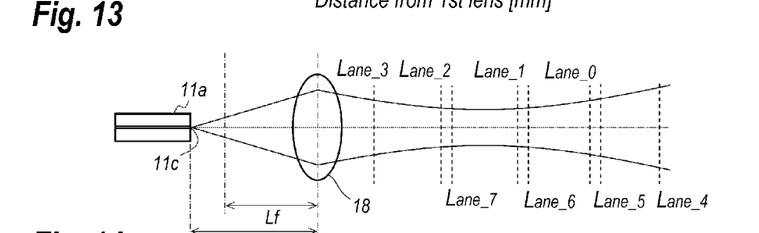
FIG. 13 shows the beam profile of the wavelength-multiplexed optical signal output from the end of the coupling fiber.

The optical receiver module 10A of the present embodiment sets the beam waist of the first lens 18 in midway between the longest and the shortest distances from the first lens 18 to the lens elements, 28a and 128a, as adjusting the position of the end of the coupling fiber 17c so as to be apart from the first lens 18. FIG. 13 shows the beam profile of the wavelength-multiplexed signal output from the end of the coupling fiber 17c. Setting the end of the coupling fiber 17c offset from the focal point of the first lens 18 in the side of the coupling fiber 17c so as to be apart from the first lens 18; that is, the distance L from the first lens 18 to the end of the coupling fiber 17c is longer than the focal length $L_f$ of the first lens 18, which makes the optical beam output from the first lens 18 to be the quasi-collimated beam, not the collimated beam.

Because the distance L from the first lens 18 to the end of the coupling fiber 17c is longer than the focal length $L_f$ of the first lens 18, the first lens 18 outputs a concentrated beam but the beam waist thereof positions in midway between the longest lane Lane_4 and the shortest lane Lane_3, exactly, between the lane Lane_1 and the lane Lane_2, or between the lane Lane_6 and the lane Lane_7. This optical system may suppress the difference in the beam diameters for the respective lanes.

Figure 14:
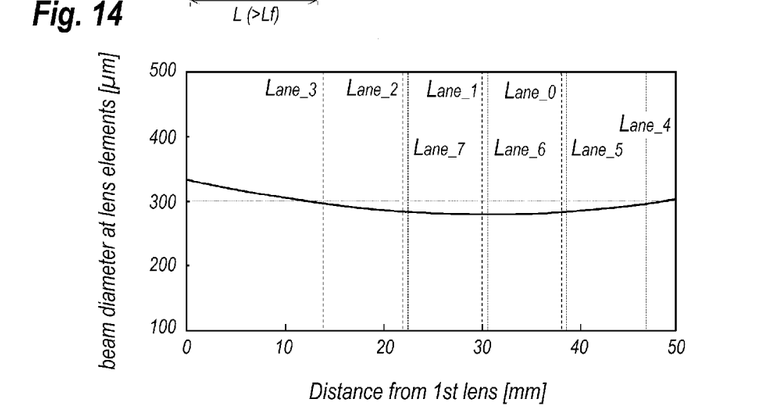
FIG. 14 shows a practical relation between the beam diameter and the beam waist in the optical module of the second embodiment.

FIG. 14 shows a practical relation between the beam diameter and the beam waist in the optical receiver module 10A of the second embodiment. The wavelength-multiplexed signal output from the first lens 18 becomes a concentrated beam, not a collimated beam, with a beam waist in midway between the longest lane Lane_4 and the shortest lane Lane_3. Moreover, the beam diameters of the longest lane Lane_4 and the shortest lane Lane_3 are each smaller than 300 μm, which means that all lens elements, 28a and 128a, may sense the optical signals de-multiplexed by the optical de-multiplexers, 26 and 126, with diameters of less than 300 μm.

The optical receiver module 10A of the second embodiment arranges the optical de-multiplexers, 26 and 126, side-by-side. However, this arrangement causes the difference in the optical paths for the lanes equivalent to each other by about 10 mm. Another arrangement may compensate this difference, where the first optical de-multiplexer retreats from the position shown in FIG. 11 by about 10 mm, or the second optical de-multiplexer 126 advances from the position shown in FIG. 11 by about 10 mm. Then, the relation between the beam waist and the optical distances of respective lanes becomes that of the optical receiver module 10 of the first embodiment. However, in such an arrangement of the optical de-multiplexers, 26 and 126, the arrayed lens 28 and the arrayed PD 29 are unable to be arranged side by side.

Third Embodiment

Figure 15:
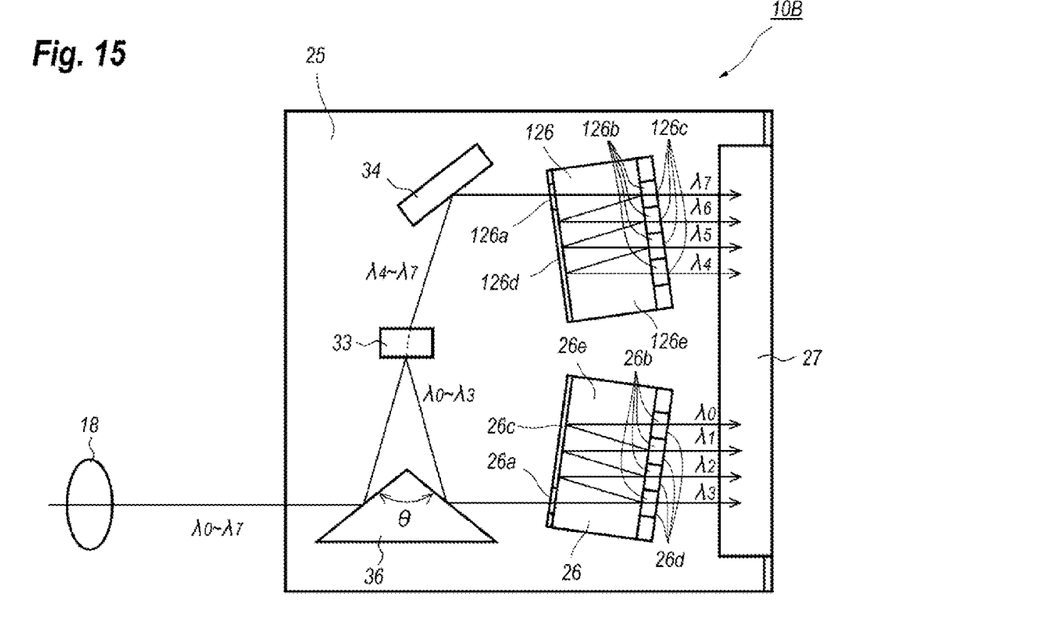
FIG. 15 is a plan view schematically showing a primary portion of the optical arrangement on the carrier according to the third embodiment of the present invention.
Figure 16:
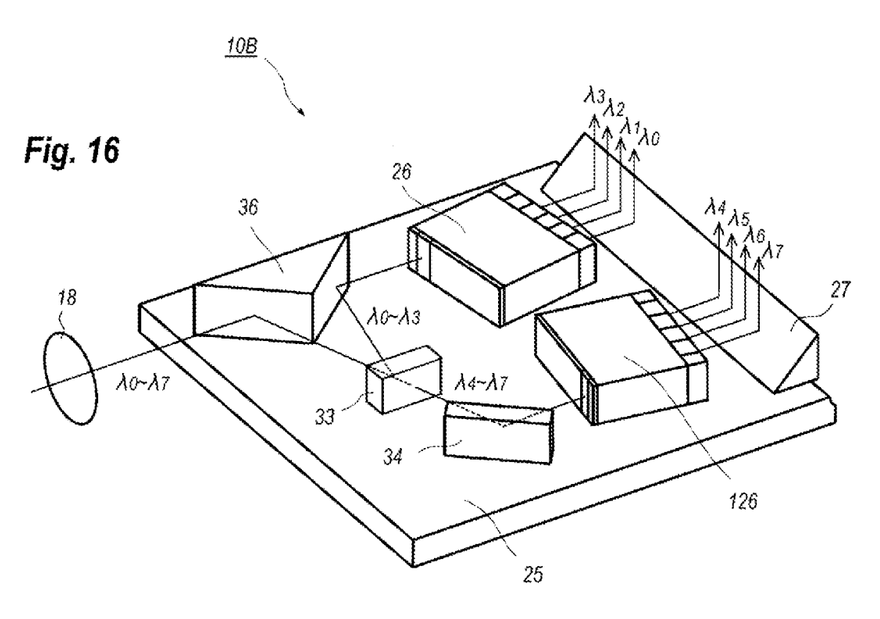
FIG. 16 views the optical arrangement on the carrier from the bottom.

The optical arrangement schematically illustrated in FIG. 15 realizes conditions that the optical distances from the first lens 18 to the respective optical de-multiplexers, 26 and 126, are substantially equal to each other, and the arrayed lenses, 28 and 128, and the arrayed PDs, 29 and 129, are placed side by side. FIG. 15 is a plan view schematically showing a primary portion of the optical arrangement on the carrier 25 according to the third embodiment of the present invention, and FIG. 16 views the optical arrangement on the carrier 25 from the bottom. The optical receiver module 10B implementing the optical arrangement shown in FIGS. 15 and 16, that receives the wavelength-multiplexed signal which contains eight (8) optical signals each having a wavelength specific thereto and different from each other, implements two optical de-multiplexers, 26 and 126, each de-multiplexes the wavelength-multiplexed signal into four optical signals. Two optical de-multiplexers, 26 and 126, are arranged such that respective distances to the first lens 18 are substantially equal to each other. In FIGS. 15 and 16, some optical components, such as the arrayed lenses, 28 and 128, the arrayed PDs, 29 and 129, and so on are omitted.

The primary portion of the optical receiver module 10B may be distinguishable from those of the second embodiment in that the optical receiver module 10B provides a prism mirror 36 instead of the mirror 35 in the second embodiment, and the WSF 33 is set such that the incident surface thereof is in parallel to the optical axis of the first lens 18. The prism mirror 36 has a cross section of an isosceles triangle with an apical angle greater than a right angle. One of equal sides facing the first lens 18 reflects the wavelength-multiplexed signal toward the WSF 33. The WSF 33, whose function is same with those of the aforementioned WSF 33 in the second embodiment, reflects the optical signals having shorter four wavelengths ($\lambda_0$~$\lambda_3$), while, transmits optical signals having longer four wavelengths ($\lambda_4$~$\lambda_7$). The prism mirror 36 in a base thereof and the WSF 33 in the incident surface thereof are parallel to the optical axis of the first lens 18, and the apical angle of the prism mirror 36 may be determined such that the incident angle of the wavelength-multiplexed signal entering the WSF 33 becomes less than 20°, preferably less than 15°.

The portion of the wavelength-multiplexed signal transmitting the WSF 33 and having wavelengths $\lambda_4$ to $\lambda_7$ enters the second optical de-multiplexer 126 reflected by the mirror 34 such that the optical axis thereof is parallel to the optical axis of the first lens 18. The second optical de-multiplexer 126, similar to those of the aforementioned embodiment, is set on the carrier 25 such that the optical axis of the input port 126a makes a substantial angle against the wavelength-multiplexed signal entering therein. The rest portion of the wavelength-multiplexed signal with the shorter wavelengths, $\lambda_0$ to $\lambda_3$, enters the first optical de-multiplexer 26 reflected by the WSF 33 and by the other equal sides of the prism mirror 36. The optical axis of the rest portion of the wavelength-multiplexed signal is also parallel to the optical axis of the first lens 18. Thus, the optical axes of the wavelength-multiplexed signals entering the respective optical de-multiplexers, 26 and 126, become substantially in parallel to each other.

Under such an arrangement of the optical de-multiplexers, 26 and 126, and the mirror 34, sliding the prism mirror 36 accompanying with the first optical de-multiplexer 26 in perpendicular to the optical axis of the first lens 18, namely, vertically in the page of FIG. 15, as keeping the input optical axis of the first optical de-multiplexer 26 in parallel to the input optical axis of the other optical de-multiplexer 126, the optical distance from the first lens 18 to the input port 26a of the first optical de-multiplexer 26 may be set substantially equal to the optical distance from the first lens 18 to the input port 126a of the second optical de-multiplexer 126.

In the embodiment shown in FIGS. 15 and 16, two optical de-multiplexers, 26 and 126, are arranged so as to make a substantial angle of the respective input ports, 26a and 126a, against the optical axis of the wavelength-multiplexed signal entering therein, which enables the optical signals output from respective output ports to have optical axes in parallel to each other. Moreover, two optical de-multiplexers, 26 and 126, are symmetrically arranged with respect to a virtual line or plane passing the WSF 33 and extending along the optical axis of the first lens 18. Thus, the optical multiplexers, 26 and 126, may output the optical signals with the respective longest wavelengths from the outermost output ports, 26c and 126c, and optical signals with relatively shorter wavelengths are output from inner output ports, 26c and 126c. Thus, the arrangement of third embodiment shown in FIGS. 15 and 16 may set not only the optical distance from the first lens 18 to the respective optical de-multiplexers substantially same to each other but also the optical distances for the respective optical signals output from the optical de-multiplexers, 26 and 126, to the arrayed lenses, 28 and 128, may be set equal to each other. Accordingly, the assemblies shown in FIG. 3 that includes the arrayed lens 28 and the arrayed PD 29 may be set side by side, and the distance between the arrayed PDs, 29 and 129, to the IC 32 may be equal to each other.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The present application claims the benefits of priority Japanese Patent Applications No. 2015-220208, filed on Nov. 10, 2015 and No. 2016-141893, filed on Jul. 19, 2016, which are incorporated herein by references.

What is claimed is:

1. An optical receiver module that receives a wavelength-multiplexed signal containing optical signals having respective wavelengths and different from each other, comprising:
   a first lens that receives and concentrates the wavelength-multiplexed signal as forming a beam waist;
   an optical de-multiplexer that de-multiplexes the wavelength-multiplexed signal into the optical signals depending on the wavelengths, the optical de-multiplexer causing optical distances for the optical signals to be different from each other;
   second lenses that concentrate the optical signals output from the optical de-multiplexer; and
   photodiodes that receive the optical signals output from the second lenses,
   wherein the beam waist of the wavelength-multiplexed signal formed by the first lens is positioned in midway between a longest path and a shortest path from the first lens to the second lenses for the optical signals.

2. The optical receiver module of claim 1,
   further including an optical fiber that provides the wavelength-multiplexed signal to the first lens,
   wherein the optical fiber in an end thereof is set apart from a focal point of the first lens toward the optical fiber.

3. The optical receiver module of claim 1,
   wherein the beam waist is positioned in an average of the optical paths from the first lens to the second lens for the respective optical signals.

4. The optical receiver module of claim 1,
   wherein the optical de-multiplexer has an input port and output ports, the input port receiving the wavelength-multiplexed signal from the first lens, the output ports each outputting the optical signals de-multiplexed from the wavelength-multiplexed signal by the optical de-multiplexer, and
   wherein the optical de-multiplexer has optical paths from the input port to the respective output ports different from each other.

5. The optical receiver module of claim 1,
   wherein the second lenses are arrayed in one body.

6. The optical receiver module of claim 5,
   wherein the second lenses show distances against the optical de-multiplexer different from each other.

7. The optical receiver module of claim 1,
   wherein the photodiodes are arrayed in one body.

8. An optical receiver module that receives a wavelength-multiplexed signal containing optical signals having wavelengths different from each other, comprising:
   a first lens that concentrates the wavelength-multiplexed signal as forming a beam waist;
   a wavelength selective filter (WSF) that receives the wavelength-multiplexed signal output from the first lens, the WSF transmitting a portion of the wavelength-multiplexed signal and reflecting a rest of wavelength-multiplexed signal, the WSF in an input optical axis thereof making an angle less than 20° against an optical axis of the wavelength-multiplexed signal entering the WSF;
   a first optical de-multiplexer that de-multiplexes the portion of the wavelength-multiplexed signal and outputs a portion of the optical signals de-multiplexed thereby;

a second optical de-multiplexer that receives the rest of the wavelength-multiplexed signal and outputs a rest of the optical signals de-multiplexed thereby;

second lenses that receive the portion of the optical signals and the rest of the optical signals;

wherein the beam waist of the wavelength-multiplexed signal formed by the first lens is positioned in midway between a longest path and a shortest path from the first lens to the second lenses for the respective optical signals.

9. The optical receiver module of claim 8, further including an optical fiber that provides the wavelength-multiplexed signal to the first lens, and wherein the optical fiber in an end thereof is set apart from the first lens from a focal point of the first lens.

10. The optical receiver module of claim 8, wherein the beam waist is positioned in an average of optical paths from the first lens to the second lens for respective optical signals.

11. The optical receiver module of claim 8, wherein the first optical de-multiplexer and the second optical de-multiplexer are arranged in side by side.

12. The optical receiver module of claim 8, wherein the first optical de-multiplexer forms an optical path to the first lens shorter than an optical path from the second optical de-multiplexer to the first lens, wherein the first optical de-multiplexer sets an input optical axis in parallel to an input optical axis of the second optical de-multiplexer, and wherein the input optical axis of the first optical de-multiplexer and the input optical axis of the second optical de-multiplexer are parallel to an optical axis of the first lens.

13. The optical receiver module of claim 8, further including photodiodes and an amplifier, the photodiodes converting the optical signals output from the second lenses into electrical signals, the amplifier amplifying the electrical signals, wherein the photodiodes have distances to the amplifier equal to each other.

14. The optical receiver module of claim 8, wherein the wavelength-multiplexed signal contains eight optical signals, the first optical de-multiplexer de-multiplexing the optical signals having shorter four wavelengths, the second optical de-multiplexer de-multiplexing the optical signals having longer four wavelengths.

15. An optical receiver module that receives a wavelength-multiplexed signal containing optical signals having wavelengths different from each other, comprising:

a first lens that concentrates the wavelength-multiplexed signal as forming a beam waist;

a wavelength selective filter (WSF) that receives the wavelength-multiplexed signal output from the first lens, the WSF transmitting a portion of the wavelength-multiplexed signal and reflecting a rest of wavelength-multiplexed signal, the WSF in an input optical axis thereof making an angle less than 20° against an optical axis of the wavelength-multiplexed signal entering the WSF;

a first optical de-multiplexer that de-multiplexes the portion of the wavelength-multiplexed signal and outputs a portion of the optical signals de-multiplexed thereby;

a second optical de-multiplexer that receives the rest of the wavelength-multiplexed signal and outputs a rest of the optical signals de-multiplexed thereby;

second lenses that receive the portion of the optical signals and the rest of the optical signals; and a prism mirror having one side and another side, the one side reflecting the wavelength-multiplexed signal output from the first lens toward the WSF, the another side reflecting the rest of the wavelength-multiplexed signal reflected by the WSF toward the first second optical de-multiplexer, wherein the beam waist of the wavelength-multiplexed signal formed by the first lens is positioned in midway between a longest path and a shortest path from the first lens to the second lenses for the respective optical signals, and wherein the first optical de-multiplexer and the second optical de-multiplexer set respective optical paths from the first lens substantially equal to each other.

16. The optical receiver module of claim 15, wherein the prism mirror has a cross section of an isosceles triangle with an apical angle formed by the one side and the another side, the apical angle being greater than a right angle.

17. The optical receiver module of claim 15, wherein the first optical de-multiplexer sets an input optical axis thereof inclined from an optical axis of the portion of the wavelength-multiplexed signal entering therein, and the second optical de-multiplexer sets an input optical axis thereof inclined from an optical axis of the rest of the wavelength-multiplexed signal entering therein, and wherein the first optical de-multiplexer and the second optical de-multiplexer are symmetrically arranged with respect to a virtual surface passing the WSF.

18. The optical receiver module of claim 15, wherein the beam waist is positioned in an average of optical paths from the first lens to the second lenses for respective optical signals.

19. The optical receiver module of claim 15, wherein the wavelength-multiplexed signal contains eight optical signals, the first optical de-multiplexer de-multiplexing the optical signals having shorter four wavelengths, the second optical de-multiplexer de-multiplexing the optical signals having longer four wavelengths.

* * * * *